United States Patent
Obata et al.

[19]

[11] Patent Number: 6,095,770
[45] Date of Patent: Aug. 1, 2000

[54] MAGNETICALLY COUPLED PUMP

[75] Inventors: Hirohisa Obata; Junji Ito, both of Obu, Japan

[73] Assignee: Aisan Kogyo Kabushiki Kaisha, Obu, Japan

[21] Appl. No.: 09/252,797

[22] Filed: Feb. 19, 1999

Related U.S. Application Data

[62] Division of application No. 08/748,781, Nov. 14, 1996, Pat. No. 5,924,851.

[30] Foreign Application Priority Data

| Dec. 8, 1995 | [JP] | Japan | 7-320570 |
| Dec. 19, 1995 | [JP] | Japan | 7-330854 |
| Jul. 25, 1996 | [JP] | Japan | 8-196506 |

[51] Int. Cl.⁷ .................................................. F04B 17/00
[52] U.S. Cl. .......................................... 417/420; 417/365
[58] Field of Search ................................. 417/420, 365

[56] References Cited

U.S. PATENT DOCUMENTS

| 3,819,293 | 6/1974 | Zitzmann | 417/420 X |
| 4,806,080 | 2/1989 | Mlzonbuchi et al. | 417/365 X |
| 5,501,582 | 3/1996 | Gautier et al. | 417/420 |
| 5,641,275 | 6/1997 | Klein et al. | 417/420 |
| 5,779,456 | 7/1998 | Bowes et al. | 417/420 |

*Primary Examiner*—Timothy S. Thorpe
*Assistant Examiner*—David J. Torrente
*Attorney, Agent, or Firm*—Arent Fox Kintner Plotkin & Kahn, PLLC

[57] ABSTRACT

A magnetically coupled pump comprising a housing partitioned into a pump chamber and a motor chamber by a partition wall. An impeller is mounted in the pump chamber. The stator of the motor is mounted in the motor chamber. The rotating shaft of the impeller is received in a recess formed in the partition wall. The rotating shaft is held by a bearing mounted in the recess. An annular permanent magnet is mounted to the side of the body of the impeller which faces the partition wall and arranged about the rotating shaft. An annular sliding contact portion is formed at an end of the bearing and makes a sliding contact with the side of the body of the impeller facing the partition wall. A pair of annular auxiliary sliding contact portions are formed in a part of the rotating shaft and in a part of the bearing, respectively. The auxiliary sliding contact portions start to make a sliding contact with each other when the annular sliding contact portion is worn by a given amount. The impeller rotates the annular sliding contact portion of the bearing while pushing it by the thrust-direction component of a magnetic attraction. The sliding contact portions are gradually worn with use. If the amount of wear reaches a given amount after prolonged use of the pump, the annular sliding contact portions begin to make a sliding contact with each other. Then, the auxiliary portions sustain the thrust-direction component of the magnetic attraction, as well as the worn sliding contact portions. Contact between the impeller and the partition wall is prevented. Decreases in the flow rate of the pump are suppressed. The life of the pump can be prolonged.

2 Claims, 7 Drawing Sheets

MAGNETICALLY COUPLED PUMP

This application is a division of application Ser. No. 08/748,781, filed Nov. 14, 1996, now U.S. Pat. No. 5,924,851.

BACKGROUND OF THE INVENTION

1. Field of the Invention

The present invention relates to a motor-driven, magnetically coupled pump which is used as an automotive water pump or the like.

2. Description of the Prior Art

A known magnetically coupled pump of this kind is described in Japanese Patent Laid-Open No. 591/1984 and comprises a pump housing whose interior is partitioned into a pump chamber and a motor chamber by a partition wall. The stator of an axial air-gap motor is mounted in the motor chamber. A rotating shaft is pivoted to the center of the stator and protrudes into the pump chamber. An impeller is mounted to the front end of this protruding shaft. An annular permanent magnet alternately magnetized south and north circumferentially is mounted on the stator side of the impeller which faces the partition wall.

In this magnetically coupled pump, exciting currents are supplied to a plurality of stator coils mounted on the outer surface of the stator to produce rotating magnetic fields at the end surfaces of the stator cores. Thus, a magnetic attraction acts between the stator and the annular permanent magnet on the impeller. Consequently, the impeller is rotated. However, the impeller equipped with the permanent magnet and acting as a rotor has the cantilevered rotating shaft. A slight clearance exists between the rotating shaft and its bearing. Also, the impeller is not locked against radial swinging movement. Therefore, if the impeller rotates with poor uniformity, the impeller tends to be vibrated. Furthermore, if the rotating shaft swings, noise is induced. This also causes rapid wear of the bearing.

In this kind of magnetically coupled pump, the magnetic attraction acting on the impeller contains a large thrust-direction attracting force component directed from the permanent magnet of the impeller toward the stator cores. Therefore, during rotation, the impeller portion at the top of the rotating shaft is pressed against the bearing of the rotating shaft with a large force. Consequently, a flat washer or the like is mounted between the impeller-holding portion of the rotating shaft and the end surface of the bearing to reduce the friction between them.

However, if fine and hard foreign matter intrudes into the pump chamber and enters the space among the end surface of the bearing, the flat washer, and the impeller-holding portion, then these components are quickly worn out. Finally, the impeller comes into contact with the partition wall inside the pump chamber. This lowers the rotating speed of the impeller. In consequence, the flow rate of the pump decreases. As a result, the life of the pump is shortened.

SUMMARY OF THE INVENTION

A magnetically coupled pump according to the invention has a stator and a rotor and comprises: a housing having an interior; a partition wall partitioning the interior of said housing into a pump chamber and a motor chamber; an impeller mounted inside said pump chamber and having a body and a rotating shaft; said stator disposed in said motor chamber; a recess or space formed in said partition wall and receiving the rotating shaft of said impeller; a bearing that supports said rotating shaft and is mounted in said recess; an annular permanent magnet mounted on a side of the body of said impeller which faces said partition wall, said permanent magnet being arranged about said rotating shaft; an annular sliding contact portion formed at an edge of said bearing and coming into a sliding contact with the side of the body of said impeller which faces said partition wall; a first annular auxiliary sliding contact portion formed in a part of said rotating shaft; and a second annular auxiliary sliding contact portion formed in a part of said bearing. The first and second annular auxiliary sliding contact portions are designed so as to come into sliding contact with each other when said annular sliding contact portion is worn by a given amount.

In the magnetically coupled pump of this construction, when the thrust-direction component of the magnetic attraction pushes and rotates the annular sliding contact portion, this portion is worn. If this annular sliding contact portion is worn by a given amount, the first and second annular auxiliary sliding contact portions come into a sliding contact with each other. Then, the auxiliary sliding contact portions sustain the pushing force of the impeller due to the thrust-direction component of the magnetic attraction bear, together with the worn sliding contact portion. This suppresses wear of the annular sliding contact portion which is at the edge of the bearing and comes into a sliding contact with the body of the impeller. The impeller is prevented from touching the partition wall. In this way, the flow rate of the pump is prevented from decreasing. This can prolong the life of the pump.

Another magnetically coupled pump according to the invention has a stator and a rotor and comprises: a housing having an interior; a partition wall partitioning the interior of said housing into a pump chamber and a motor chamber; a recess or space formed in said partition wall; said stator disposed in said motor chamber; a rotating shaft mounted in said recess and centered at said stator, said rotating shaft protruding into said pump chamber, said rotating shaft having a front end; an impeller mounted to the front end of said rotating shaft which is located inside said pump chamber; and an annular permanent magnet mounted to a side of said impeller which faces said partition wall. The permanent magnet forms a part of the motor rotor. The center radius (described later) of the permanent magnet is set smaller than the radius of a circle connecting the centers of cores of the stator. The outer surface of the permanent magnet is located inside the outer surfaces of the stator cores. The inner surface of the permanent magnet is located inside the inner surfaces of the stator cores. The permanent magnet and the stator cores have portions which overlap each other vertically.

In the magnetically coupled pump of this structure, when the impeller is rotated, the permanent magnet is located obliquely inside the end surfaces of the stator cores, because the center radius of the permanent magnet is smaller than the radius of the circle connecting the centers of the stator cores. A radial force F directed outward acts on the outer surface of the permanent magnet. This force F suppresses swinging movement of the impeller.

Therefore, if a slight clearance exists between the rotating shaft and its bearing, and if the impeller rotates with somewhat poor uniformity, a radial force acts on the outer surface of the permanent magnet during rotation. This effectively suppresses swinging movement of the impeller, thus reducing noise due to vibration of the rotating shaft. Hence, wear of the bearing can be reduced.

A further magnetically coupled pump according to the invention has a stator and a rotor and comprises: a housing having an interior; a partition wall partitioning the interior of said housing into a pump chamber and a motor chamber; an impeller mounted inside said pump chamber and equipped with a rotating shaft having a front end; a recess or space formed in a center of said partition wall and receiving the rotating shaft of said impeller; an annular permanent magnet mounted to a side of said impeller which faces said partition wall; said stator disposed in said motor chamber and producing a rotating magnetic field that said permanent magnet follows, thus rotating said impeller; an enlarged front end portion formed around the front end of said rotating shaft and having front and rear surfaces, said impeller being mounted to said enlarged front end portion; a bearing formed around said recess and having an end; a thrust bearing surface formed at the end of said bearing and coming into a contact with the rear surface of said enlarged front end portion; and a plurality of balance holes formed in said enlarged front end portion and extending from its front surface to its rear surface, said balance holes having rear end surfaces which overlap with said thrust bearing surface.

In the magnetically coupled pump of this construction, the rear end surfaces of the balance holes have portions overlapping the thrust bearing surface. Therefore, during rotation of the impeller, a negative pressure is created on the front side of the impeller, while a positive pressure is developed on the rear side (strictly, on the rear side of the permanent magnet). Fluid passes from the front side of the impeller to the rear side and then flows to the front side of the impeller via the balance holes. During this process, the fluid passes by the portion of the thrust bearing surface which contacts the rear surface of the enlarged front end portion of the rotating shaft. Therefore, foreign matter is not readily deposited on this contacting portion. As a result, the rear surface of the enlarged front end portion and the thrust bearing surface wear more slowly.

In another feature of this magnetically coupled pump, a narrow portion is formed in the rotating shaft and located behind the enlarged front end portion. This narrow portion is inserted in the recess formed in the center of the partition wall. A radial bearing surface capable of coming into contact with the narrow portion is formed in the inner surface of the recess. A communication hole is formed in the sidewall of the recess to place the pump chamber in communication with the recess in which the rotating shaft is accommodated.

In the magnetically coupled pump of this construction, during rotation of the impeller, fluid passes from the front side of the impeller to the rear side. Then, a part of the fluid flows through the communication hole and enters the gap between the narrow portion of the rotating shaft and the radial thrust bearing surface. The fluid then passes between the rear surface of the enlarged front end portion and the thrust bearing surface and reaches the balance holes. Because of this flow of the fluid, foreign matter is not readily deposited on the portion of the thrust bearing surface which is in contact with the rear surface of the enlarged front end portion. As a result, the rear surface of the enlarged front end portion and the thrust bearing surface wear more slowly.

It is an object of the present invention to provide a magnetically coupled pump which has the above-described construction to thereby reduce wear of the rotating shaft of the impeller and the bearing, thus prolonging the life of the pump.

Other objects and features of the invention will appear in the course of the description thereof, which follows.

DETAILED DESCRIPTION OF THE PREFERRED EMBODIMENTS

Figure 1:
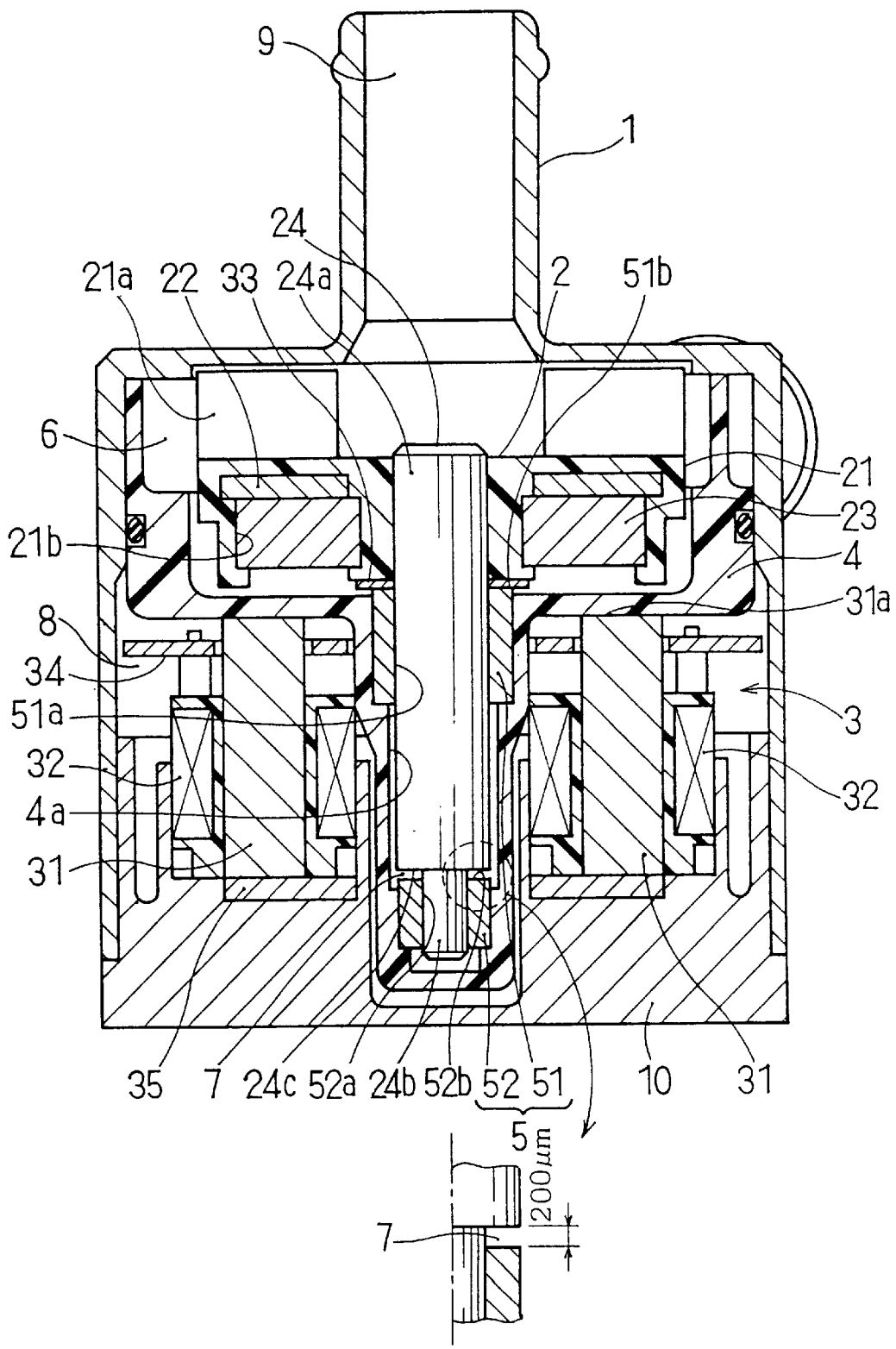
FIG. 1 is an axial sectional view of a magnetically coupled pump according to the invention.

Referring to FIG. 1, there is shown a magnetically coupled pump embodying the concept of the present invention. This pump has a housing 1 whose interior is partitioned into a pump chamber 6 and a motor chamber 8 by a partition wall 4. The bottom of the housing 1 is closed off by a cover 10. An impeller 2 having a rotating shaft 24 is disposed inside the pump chamber 6. The rotating shaft 24 is held by a bearing 5 which is mounted in a recess or bearing-receiving portion 4a formed in the center of the partition wall 4. An intake port 9 is formed in the top surface of the housing 1. An exit port (not shown) is formed in the sidewall of the pump chamber 6.

The impeller 2 comprises a disklike body 21, the aforementioned rotating shaft 24 protruding from the center of the rear surface of the body 21, a magnetic force-reinforcing magnetic plate 22 disposed in a recess 21b formed in the body 21, and an annular permanent magnet 23. The body 21 of the impeller has a plurality of blades 21a and is made of brass or a resin such as polyphenylene sulfide (PPS). The recess 21b extends circumferentially of the rotating shaft 24.

Referring still to FIG. 1, the rotating shaft 24 has an enlarged portion 24a on the side of the body 21 of the impeller. The shaft further includes a narrow portion 24b around its front end. An axial air-gap motor stator 3 is mounted in the motor chamber 8. A part of the rotor of this motor is formed by the permanent magnet. The stator 3 is disposed around the rotating shaft 24. A magnetic attracting force is made to act on the permanent magnet 23 to rotate the impeller 2.

More specifically, the stator 3 comprises a plurality of stator cores 31 and stator coils 32 wound around the cores 31, respectively. The stator cores 31 have end surfaces 31a arranged circumferentially so as to be located opposite to the permanent magnet 23. Exciting currents are fed into the stator coils 32 to set up rotating magnetic fields at the end surfaces 31a of the stator cores 31. A printed-wiring board 34 used for controlling purposes has a circuit for controlling the exciting currents. The board 34 is mounted on the stator 3. The magnetic force-reinforcing magnetic plate 35 is located under the stator cores 31.

The partition wall 4 is made of PPS or other resin. To achieve miniaturization of the pump, the partition wall 4 is located close to the body 21. The bearing 5 comprises a first bearing member 51 located on the side of the body 21 of the impeller 2 and a second bearing member 52 positioned near the front end of the rotating shaft 24. These two bearing members 51 and 52 take the form of a hollow cylinder, and are made of resinous material or sintered copper-based alloy. These bearing members 51 and 52 are mounted in the bearing-receiving portion 4a with a press fit with an axial spacing between them. The bearing-receiving portion 4a has a bottom and is formed in the center of the partition wall 4. The rotating shaft 24 is rotatably held by the inner surfaces 51a and 52a of the bearing members.

The enlarged portion 24a of the rotating shaft 24 is rotatably held by the first bearing member 51. The narrow portion 24b of the rotating shaft 24 is rotatably held by the second bearing member 52. An annular sliding contact portion 51b coming into sliding contact with a flat washer 33 of stainless steel is formed on the first bearing portion 51, in the same way as in the aforementioned first bearing member 51 of the prior art structure. The washer 33 is mounted around the rotating shaft 24.

In the above-described prior art, the second bearing member 52 rotatably holds the rotating shaft 24 by its inner surface 52a alone. On the other hand, in FIG. 1, the second bearing member 52 is so constructed that an annular step portion 24c and an annular end surface 52b are located opposite to each other with a slight gap 7 of about 200 μm, for example, between them. The step portion 24c is formed between the enlarged portion 24a and the narrow portion 24b of the rotating shaft 24.

These annular step portion 24c and annular end surface 52b form a pair of auxiliary sliding contact portions which begin to make a sliding contact with each other when the annular sliding contact portion 51b is worn by an amount equal to the size of the gap 7 since the impeller 2 pushes and rotates the sliding contact portion 51b by the thrust-direction component of the magnetic attraction.

Figure 2:
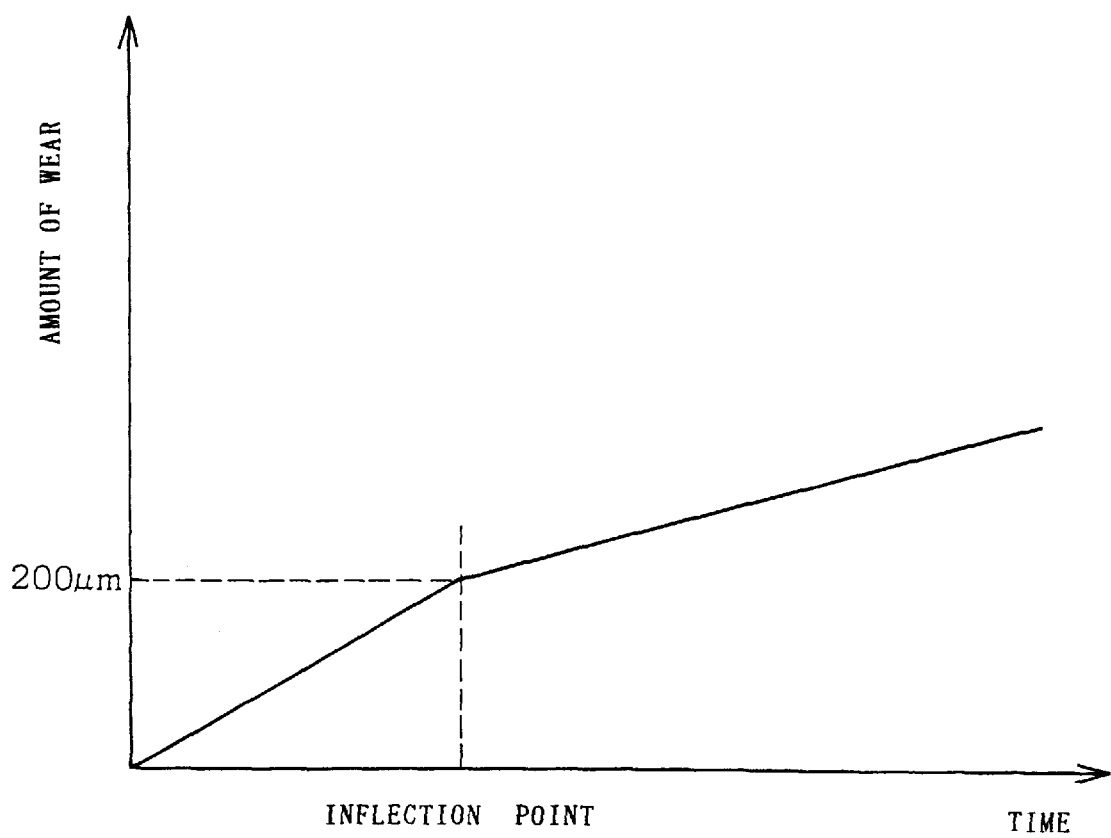
FIG. 2 is a graph in which the amount of wear of a sliding contact portion 51b of a bearing 51 included in the magnetically coupled pump shown in FIG. 1 is plotted against time.

After the auxiliary sliding contact portions 24c and 52b have made sliding contact with each other, the annular end surface 52b of the second bearing member 52 sustains the pushing force of the impeller due to the thrust-direction component of the magnetic attraction, together with the sliding contact portion 51b. This suppresses wear of the sliding contact portion 51b. More specifically, the rate of change of the amount of wear of the sliding contact portion 51b with respect to time is represented by the curve of FIG. 2, the curve having an inflection point. This inflection point indicates that the amount of wear has become equal to the dimension of the gap 7. After this inflection point has been reached, the rate of wear is suppressed. Therefore, the life of the first bearing member 51 in the thrust direction is prolonged. Hence, decreases in the flow rate of the pump can be suppressed.

Figure 3:
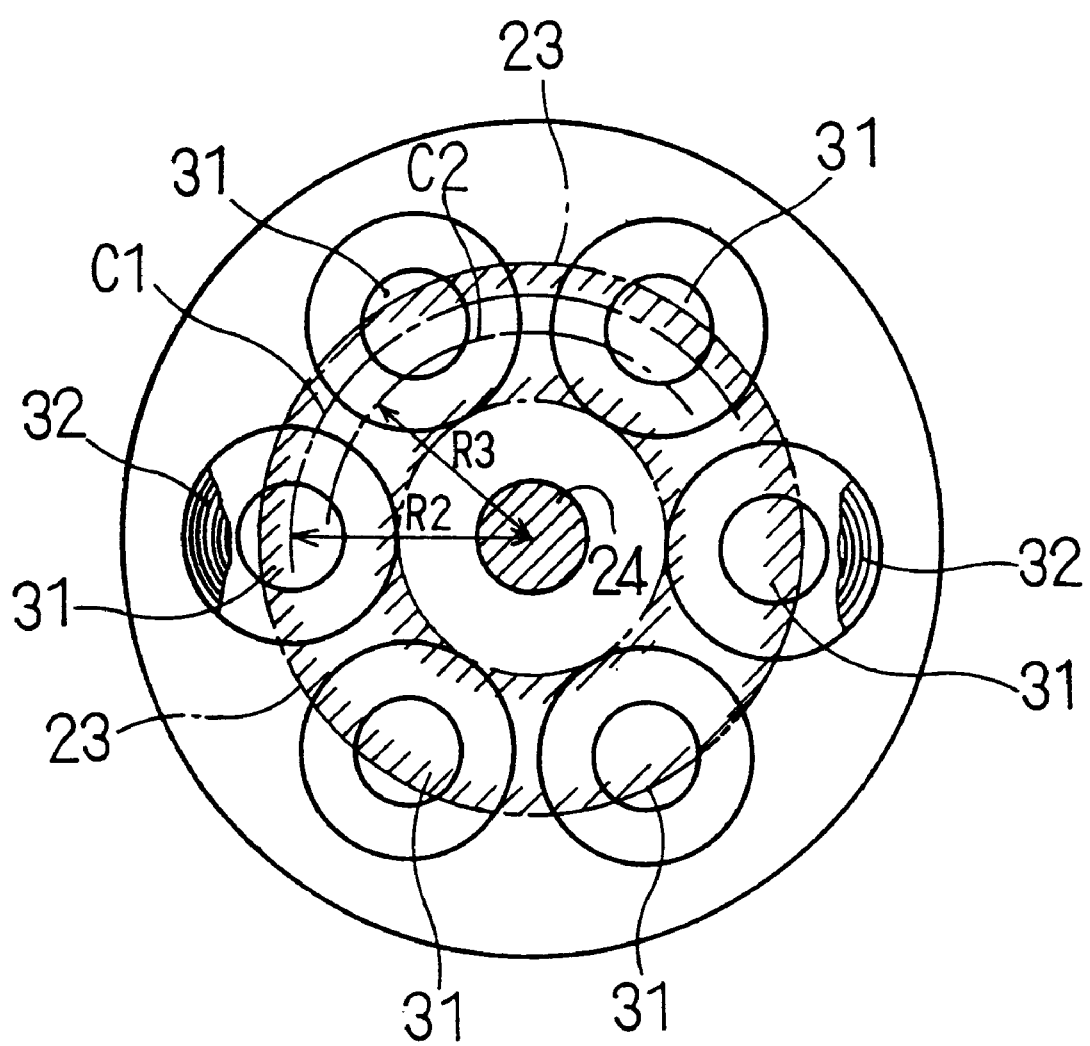
FIG. 3 is a plan view of a stator and a permanent magnet included in the magnetically coupled pump shown in FIG. 1, illustrating their positional relation.
Figure 4:
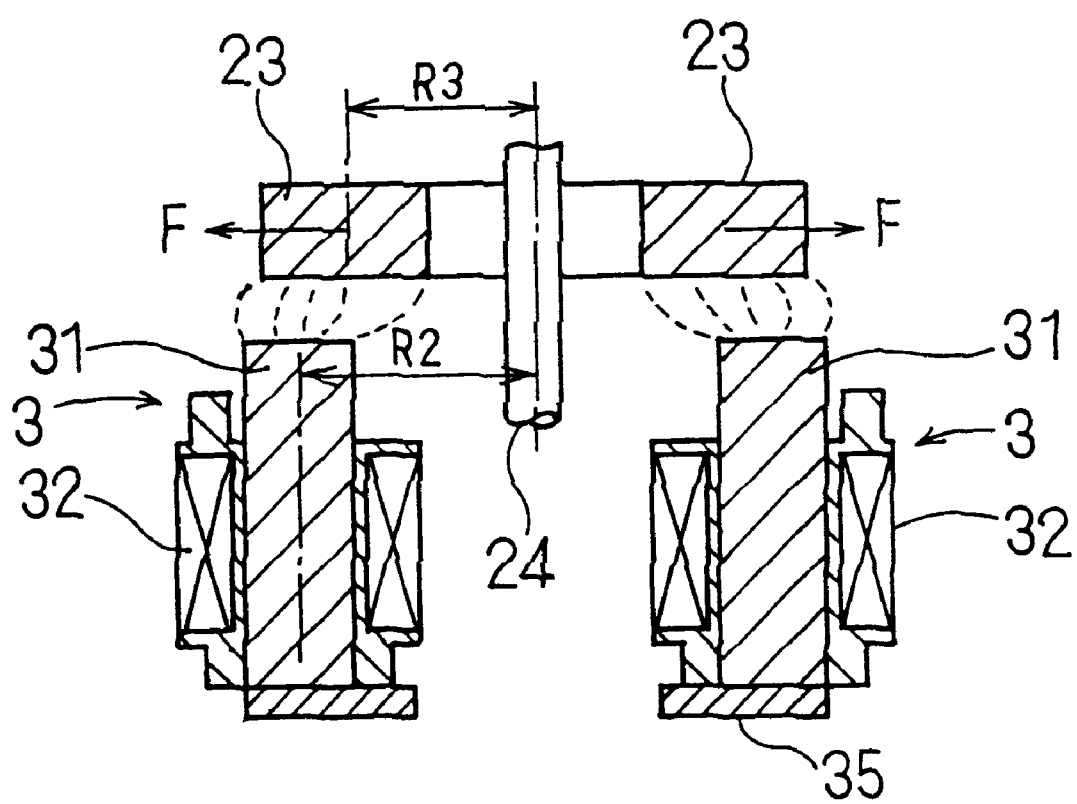
FIG. 4 is a fragmentary cross section of the magnetically coupled pump shown in FIG. 1, illustrating a force F acting on the permanent magnet during rotation.

Referring to FIG. 3, the permanent magnet 23 is shaped annularly and made of a ferroelectric substance such as ferrite. The magnet 23 is polarized south and north alternately at intervals of 90 degrees circumferentially. The distance between the center of this permanent magnet and a line lying midway between the outer surface of the magnet and the inner surface is indicated by R3, and is herein referred to as the center radius. A circle connecting the centers of the stator cores 31 has a radius of R2. As shown in FIG. 4, the center radius R3 is set smaller than the radius R2.

The stator 3 has six magnetic poles, for example, which are regularly spaced from each other around the rotating shaft 24. As shown in FIG. 3, the stator cores 31 of the stator 3 are shape cylindrically and spaced 60 degrees from each other on a circumference of a circle which is centered at the rotating shaft 24.

As shown in FIG. 3, the six stator cores 31 are so arranged that their centers are located on the circumference of a circle C1 having the radius R2. This circle C1 is centered at the axis of the rotating shaft 24. The permanent magnet 23 is disposed coaxially with the rotating shaft 24, i.e., coaxially with the circle C1 connecting the stator cores. The center radius R3 of the circle C2 passing through the center of the magnet is set smaller than the radius R2 of the circle C1 connecting the centers of the stator cores 31.

If the center radius R3 of the permanent magnet 23 is made too small, the distance to the end surfaces of the stator cores, i.e., the air gap, increases. As a result, the driving force that rotates the impeller 2 acting as a rotor drops. For this reason, the lower limit of the center radius R3 which is smaller than the radius R2 of the circle C1 described above is required to be so set that the permanent magnet 23 overlaps at least parts of the end surfaces of the stator cores 31.

By setting the center radius R3 of the permanent magnet 23 smaller than the radius R2 of the circle C1 connecting the centers of the stator cores 31 in this way, the outer surface of the permanent magnet 23 is located inside the circle connecting the outer surfaces of the stator cores 31, as shown in FIG. 4. Also, the inner surfaces of the permanent magnet 23 is located inside the circle connecting the inner surfaces of the stator cores 31. When the rotating shaft 24 is driven, the force F directed outward acts on the permanent magnet 23. This force F suppresses swinging movement of the impeller 2.

In the magnetically coupled pump of the construction described above, if exciting currents are supplied to the stator coils 32 at given timing, a rotating magnetic field is produced in the stator 3. A magnetic attraction acts on the permanent magnet 23 in each stator core 31. This rotates the permanent magnet 23, i.e., the impeller 2, about the rotating shaft 24. This, in turn, forces water out of the exit port after it is taken in through the intake port 9.

When the impeller 2 is driven in this manner, the permanent magnet 23 is located obliquely inside the stator cores 31, as shown in FIG. 4, because the center radius R3 of the permanent magnet 23 is set smaller than the radius R2 of the circle connecting the centers of the stator cores 31. Therefore, a radial-direction force F directed outward acts on the outer surface of the permanent magnet 23. This force F suppresses swinging movement of the impeller 2.

Accordingly, if a slight clearance exists between the rotating shaft 24 and its bearing, and if the impeller 2 rotates with somewhat poor uniformity, a radial-direction force F acts on the outer surface of the permanent magnet 23 during rotation. This effectively suppresses swinging movement of the impeller 2, thus reducing noise due to vibration of the rotating shaft 24. Hence, wear of the bearing 5 can be reduced.

Figure 5:
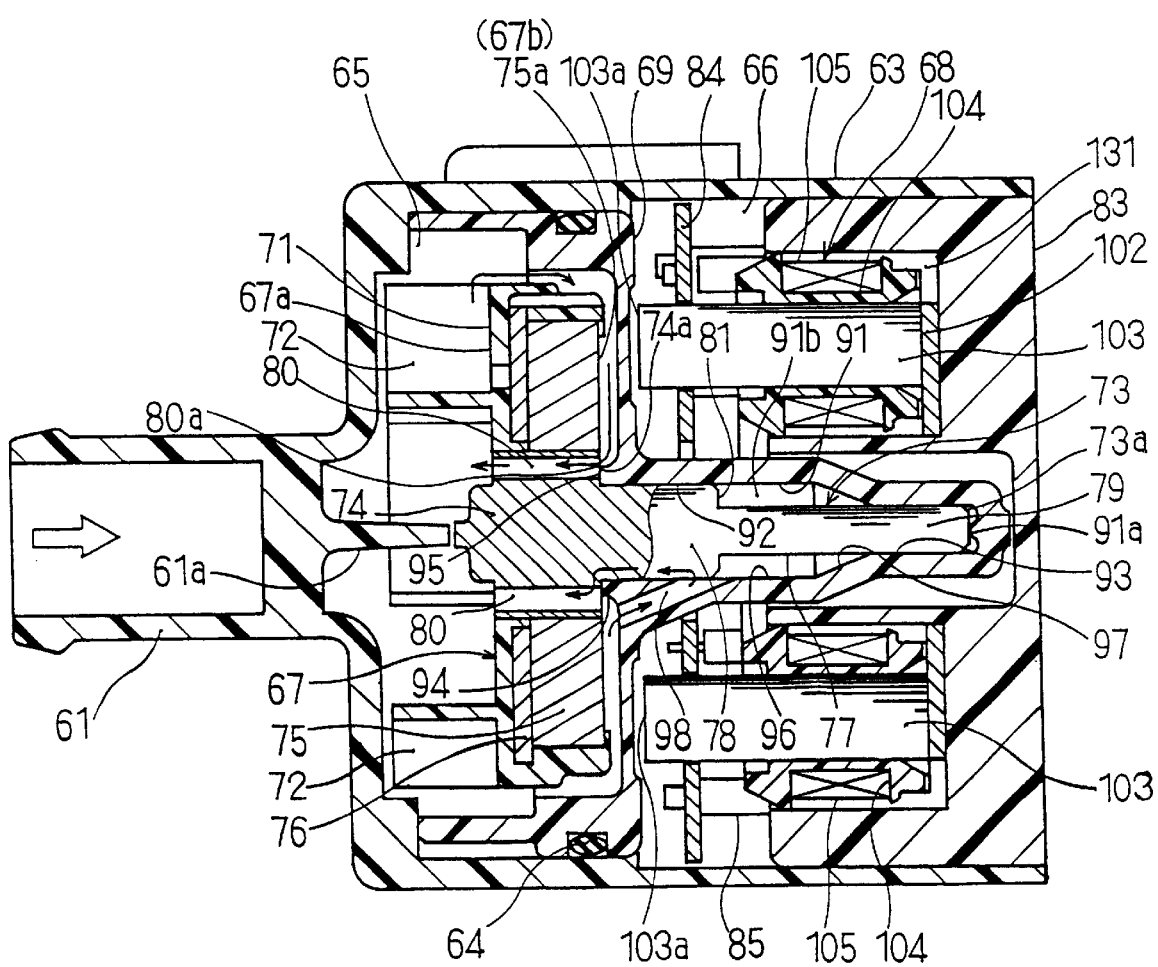
FIG. 5 is an axial sectional view of another magnetically coupled pump according to the invention.
Figure 6:
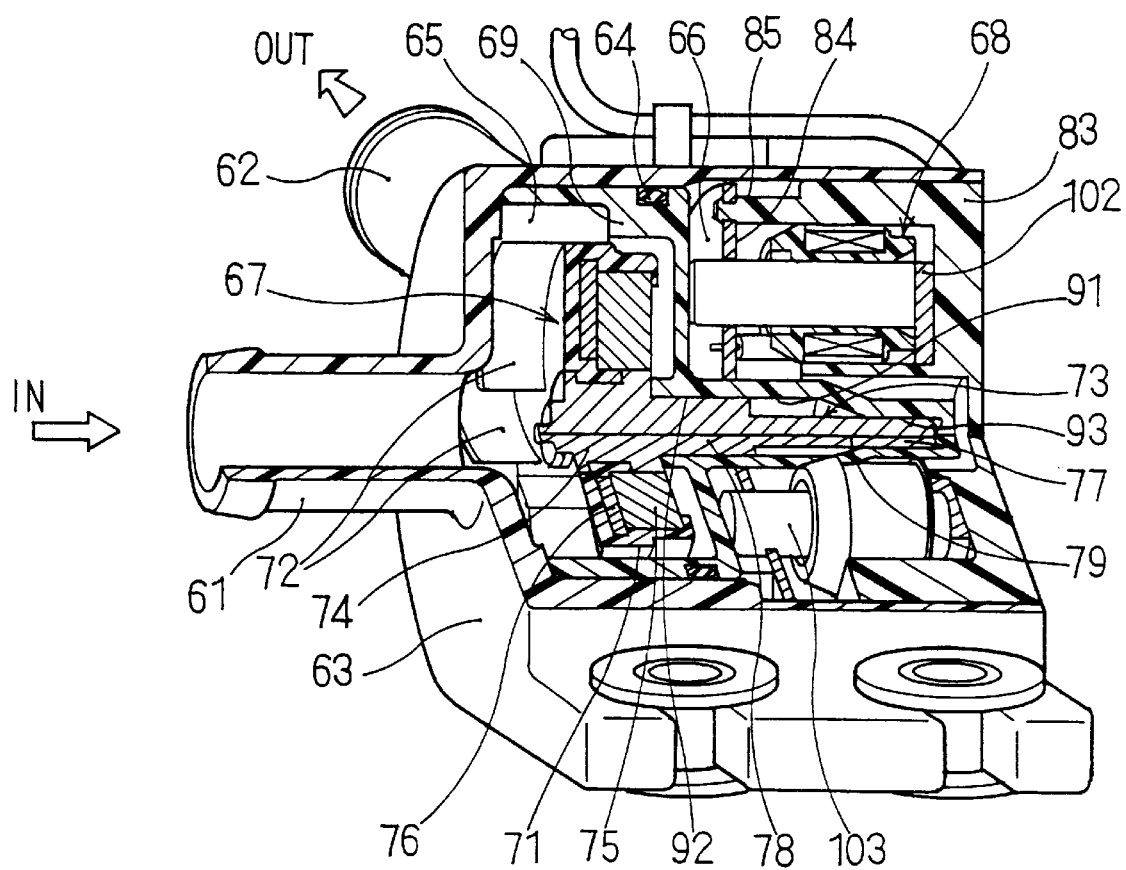
FIG. 6 is a perspective view partially in cross section of the magnetically coupled pump shown in FIG. 5.
Figure 7:
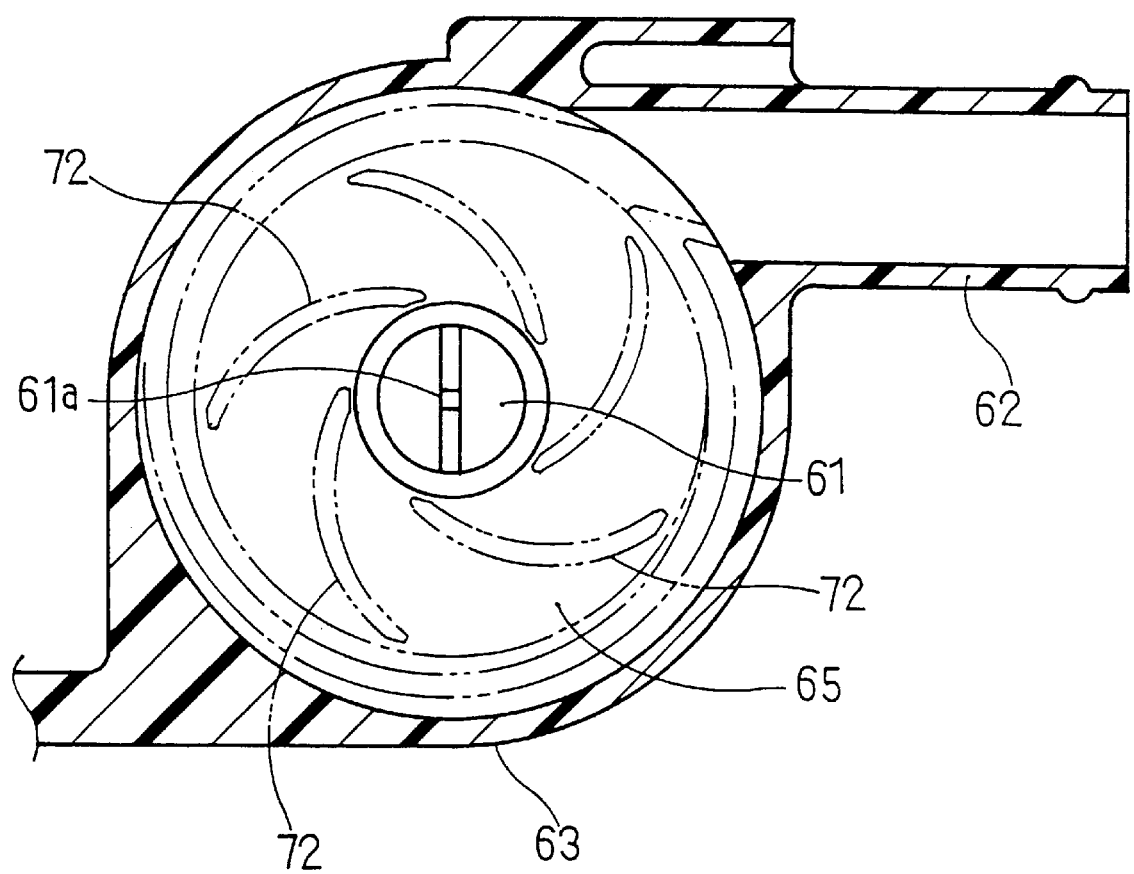
FIG. 7 is a cross-sectional view of a pump chamber formed in the pump shown in FIG. 5.

Referring next to FIGS. 5–7, there is shown a further magnetically coupled pump according to the invention. This pump comprises a housing 63 having a fluid intake port 61 and an exit port 62. The interior of the housing 63 is partitioned into a pump chamber 65 and a motor chamber 66 by a partition wall 69 which is maintained airtight by an O-ring 64. The pump chamber 65 is located on the side of the intake port 61 and exit port 62. An impeller 67 is mounted in the pump chamber 65.

The impeller 67 consists mainly of a body 71. A plurality of blades 72 are formed on the front surface of the body 71 and equally spaced from each other on the same circumference. The impeller 67 has a rotating shaft 73 provided with an enlarged front end portion 74. This enlarged front end portion 74 is firmly secured to the center of the impeller 67. An annular permanent magnet 75 and an annular magnetic plate 76 are mounted to the side of the impeller which faces the partition wall so that they surround the enlarged front end portion 74. The permanent magnet 75 is polarized south and north alternately circumferentially. The rotating shaft 73 has a narrow portion 77 behind the enlarged front end portion 74. This narrow portion 77 is received in a cylindrical shaft-receiving portion 91 having a bottom, the receiving portion 91 being formed in the center of the partition wall 69.

The narrow portion 77 consists of a first shaft portion 78 of an intermediate diameter and a second shaft portion 79 of a small diameter. The first shaft portion 78 and second shaft portion 79 are rotatably held by a first radial bearing surface 92 and a second radial bearing surface 93, respectively, of the shaft-receiving portion 91. It follows that a bearing having the first radial bearing surface 92 and the second radial bearing surface 93 is formed inside the shaft-receiving portion 91. This bearing is molded from a hard synthetic resin integrally with the partition wall 69 having the shaft-receiving portion 91. Consequently, metallic bearings can be omitted. Also, the number of components can be reduced.

An annular protrusion 94 is formed on the bearing-receiving portion 91, i.e., at the front end of the bearing, and slightly protrudes toward the pump chamber 65. A thrust bearing surface 95 is formed over the protrusion 94. This thrust bearing surface 95 is in contact with the rear surface 74*a* of the enlarged front end portion 74 of the rotating shaft 73 and supports it. A plurality of (two, in the present embodiment) balance holes 80 are formed in the enlarged front end portion 74 of the rotating shaft 73. The balance holes 80 are formed on the same circumference and act to place the front surface of the shaft in communication with the rear surface. Each balance hole 80 has a rear surface 80*a* which is so positioned that it overlaps with the thrust bearing surface 95.

The balance holes 80 extending from the front surface to the rear surface places the front surface 67*a* and the rear surface 67*b* of the impeller 67 in communication with each other so that the pressure on the side of the front surface 67*a* of the impeller 67 is balanced against the pressure on the side of the rear surface 67*b*. When the impeller 67 is rotated, a negative pressure is produced on the side of the front surface 67*a* of the impeller 67. A positive pressure is developed on the side of the rear surface 67*b* (strictly, on the side of the rear surface 75*a* of the permanent magnet 75). Therefore, the impeller 67 would normally easily move forward against the magnetic attraction of the stator 68. However, the balance holes 80 reduce the difference in pressure between the front side and the rear side. Hence, forward movement of the impeller 67 is hindered.

An inner surface 96 having the same diameter as the diameter of the first radial bearing surface 92 and an inclined surface 97 extending from the inner surface 96 to the second radial bearing surface 93 are formed between the first radial bearing surface 92 and the second radial bearing surface 93 of the bearing-receiving portion 91. A space 91*b* is formed by the inner surface 96, the inclined surface 97, the outer surface of the second shaft portion 79, and a step portion 81. A communication hole 98 is formed in the sidewall of the shaft-receiving portion 91 to place the pump chamber 65 in communication with the interior of the shaft-receiving portion 91. This communication hole 98 forms a fluid passage. When the pump is started, the communication hole 98 also acts to drain air from the bearing-receiving portion 91.

A protrusion 91*a* is formed on the inner bottom of the bearing-receiving portion 91 and spaced from the rear end surface 73*a* of the rotating shaft 73. If the thrust bearing surface 95 is worn, this protrusion 91*a* begins to contact the rear end surface 73*a* of the rotating shaft 73. When they are in contact with each other, they cooperate with the thrust bearing surface 95 to form a thrust bearing. This decelerates wear of the thrust bearing surface 95. A rodlike protrusion 61*a* is formed in the intake port 61 formed in the housing 63, and protrudes toward the enlarged front end portion 74 of the rotating shaft 73. This rodlike protrusion 61*a* limits movement of the impeller 67 toward the intake port 61.

A motor stator 68 for rotating the impeller 67 is mounted in the motor chamber 66. The stator 68 comprises a plurality of stator cores 103, a stator coil 105 wound around a bobbin 104, and an annular magnetic plate 102. The stator cores 103 are arranged so as to surround the bearing-receiving portion 91 in the partition wall 69, and are regularly spaced from each other on the same circumference. A cover 83 attached to the housing 63 closes the motor chamber 66. The cover 83 is provided with an annular recess 131 in which the stator 68 is received. The stator cores 103 have front end surfaces 103*a* which face the rear surface 75*a* of the permanent magnet 75.

A circuit board 84 is disposed inside the motor chamber 66. A control circuit for controlling energization of the stator coils 105 of the stator to produce a rotating magnetic field is packed on the circuit board 84. A plurality of detents 85 protrude forwardly from the cover 83 and lock the circuit board 84 to the motor chamber 66.

The operation of the magnetically coupled pump constructed as described thus far is next described. When the stator 68 is made to produce a rotating magnetic field, the permanent magnet 75 follows the rotating field and thus is rotated. This rotates the impeller 67, thus forcing fluid into the pump chamber 65 through the intake port 61. The fluid is then discharged from the exit port 62. When this pump is in operation, a negative pressure is produced on the side of the front surface 67*a* of the impeller 67. A positive pressure is developed on the side of the rear surface 67*b* (strictly, on the side of the rear surface 75*a* of the permanent magnet 75). As indicated by the arrow in FIG. 5, the fluid sent from the side of the front surface 67*a* of the impeller 67 to the side of the rear surface 67*b* flows toward the front surface 67*a* of the impeller 67 via the balance holes 80. During this movement, the fluid passes by the contact surface between the rear surface 74*a* of the enlarged front end portion 74 of the shaft 73 and the thrust bearing surface 95 of the partition wall 69. Therefore, foreign matter is not readily deposited on this contact surface. As a result, wear of the rear surface 74*a* of the enlarged front end portion 74 and of the thrust bearing surface 95 is effectively suppressed.

As indicated by the arrow in FIG. 5, a part of the fluid flowing from the side of the front surface 67*a* of the impeller 67 toward the rear surface 67*b* passes through the communication hole 98 and enters the gap between the outer surface of the first shaft portion 78 of the shaft 73 and the first radial bearing surface 92. The fluid then passes through the space between the rear surface 74*a* of the enlarged front end portion 74 and the thrust bearing surface 95 and enters the balance holes 80. In the presence of the flow of this fluid, foreign matter is not readily deposited on the contact surface between the rear surface 74*a* of the enlarged front end portion 74 and the thrust bearing surface 95. This effectively suppresses wear of the rear surface 74*a* of the enlarged front end portion 74 and of the thrust bearing surface 95. Hence, the lifetime of the pump can be prolonged.

If the thrust bearing surface 95 and the rear surface 74*a* of the enlarged front end portion 74 are worn, the rear end surface 73*a* of the rotating shaft 73 begin to contact the protrusion 91*a* at the bottom. Then, the rear end surface cooperates with the thrust bearing surface 95 to sustain the axial force of the rotating shaft 73. Therefore, contact between the impeller 67 and the partition wall 69 due to wear of the thrust bearing surface 95 is prevented. Consequently, the life of the pump can be prolonged.

What is claimed is:

1. A magnetically coupled pump comprising:

a housing having a pump chamber and a motor chamber with a partition wall provided therebetween;

a rotating shaft inserted into a shaft-receiving portion provided in said partition wall, said rotating shaft having an enlarged diameter end portion formed around one top end portion thereof, said enlarged diameter end portion having balance holes formed to communicate both end faces of said enlarged diameter end portion;

a stator of a motor disposed in said motor chamber;

an impeller fixed to said enlarged diameter end portion of said rotating shaft into said pump chamber;

an annular permanent magnet fixed to said impeller on a side facing said partition wall to form a part of a rotor of said motor; and a bearing provided in said shaft-receiving portion for supporting said rotating shaft, and comprising a thrust bearing formed at one end of said bearing on a side facing said partition wall, said thrust bearing having a thrust bearing face disposed to contact an end face of said enlarged diameter end portion of said rotating shaft on a side facing said partition wall, and said balance holes being disposed so as to partially overlap with said thrust bearing face in said end face of said enlarged diameter end portion on a side facing said partition wall.

2. The magnetically coupled pump as claimed in claim 1, wherein said bearing is formed integrally with said shaft-receiving portion and said partition wall, said shaft container has a space formed inside thereof and a communication hole provided on a side thereof to communicate said pump chamber and inside of said shaft-receiving portion.

* * * * *